*INVENTOR.*
HENRY R. HOUCHINS

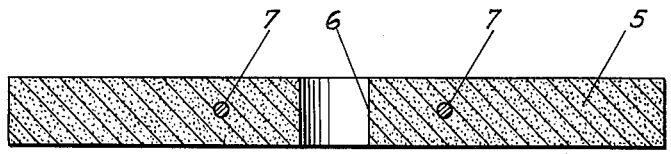
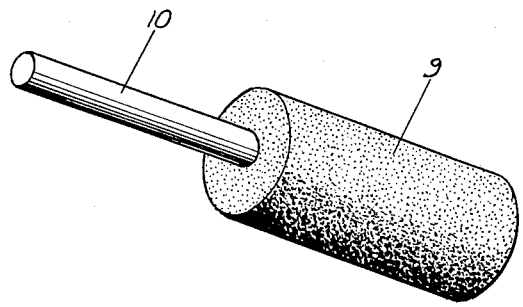
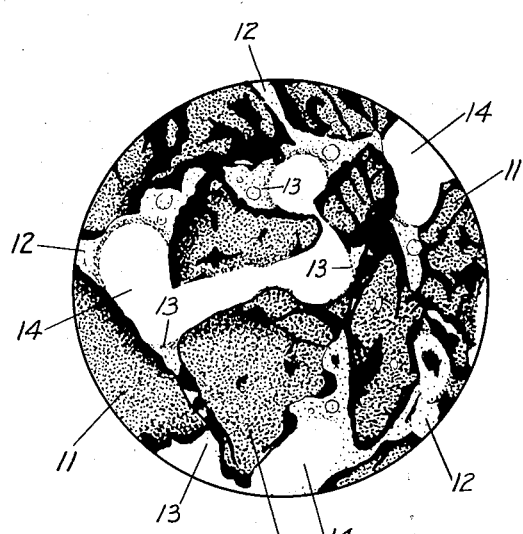
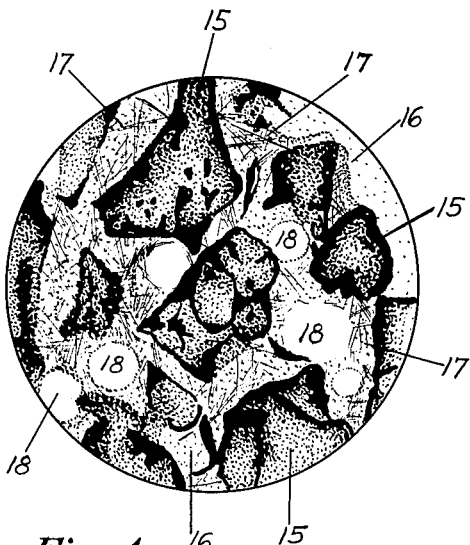

United States Patent Office 2,730,439
Patented Jan. 10, 1956

2,730,439
ABRASIVE ARTICLES AND METHOD OF MAKING SAME

Henry R. Houchins, Niagara Falls, N. Y., assignor to The Carborundum Company, Niagara Falls, N. Y., a corporation of Delaware Application March 19, 1953, Serial No. 343,296

7 Claims. (Cl. 51—307)

This invention relates to vitrified bonded, fused alumina articles, and more particularly to fused alumina abrasive articles such as grinding wheels, sharpening stones, hones, sticks and other shapes bonded by vitrified borosilicate compositions, and to methods of making such articles.

This application is a continuation-in-part of my copending application Serial No. 146,841, filed February 28, 1950, and now abandoned.

Borosilicate compositions have heretofore been proposed for use in the making of ceramic bonded abrasive products. For example, certain borosilicate compositions have been used in bonded silicon carbide abrasive products, as disclosed in Lombard et al. U. S. Patent No. 2,332,241 and Lombard U. S. Patent No. 2,343,218, but those borosilicate compositions which have been developed for the bonding of granular silicon carbide and other oxidizable abrasive grains have been found none too satisfactory for the making of fused alumina bodies. That is only to be expected since it has been common experience over the years that that which may constitute an excellent material for the bonding of one kind of abrasive particle is not necessarily of value in the bonding of other kinds of abrasive particles towards which it often exhibits little or no bonding power or on the other hand is found to be so reactive as to attack and destroy or otherwise interfere with the abrading ability of the material. Therefore, it is not surprising that those particular borosilicate compositions found so useful in bonding silicon carbide have not been found particularly acceptable for bonding granular fused alumina. Also, other borosilicate compositions, such as the lead borosilicate glass bonds disclosed in Harvey U. S. Patent No. 2,316,161, proposed for use in the bonding of other abrasive materials, including granular alumina have been deficient or unsatisfactory in one respect or another and therefore not been wholly acceptable.

Consequently, this invention should not be construed as covering all borosilicate compositions nor should it be interpreted as covering the bonding of all types of abrasive materials. On the contrary it is concerned with the bonding of granular fused alumina by means of specific types of alkali borosilicate compositions which have been found to be especially well suited for use with fused alumina particles with many attendant advantages.

It is desirable in making vitreous bonded, fused alumina abrasive products, firstly, that the bond be capable of wetting and adhering to the particles of alumina with tenacity in order that the strength of the bonded article will be sufficient to resist breakage of the article under grinding conditions, and which strength will permit operation at grinding wheel speeds at which grinding or cutting action will be most effective and efficient. It is also desirable that thorough bond vitrification will take place without requiring excessively high temperatures or extended periods of firing for reasons of economy of manufacture. A low firing temperature is further preferred in order that metallic reinforcing means and other metallic elements such as mounting spindles or shafts incorporated in the abrasive body at the time of molding will not be damaged during the subsequent firing of the article.

Furthermore, it is important and desirable that the bond have an affinity or adhesiveness toward the alumina particles which will promote the requisite high strength in the fired article with a minimum amount of bond. It is also desirable that the vitrified bond will be of a sufficient hardness to allow the manufacture of abrasive wheels and other articles which will have the high hardness grades required for grinding many substances for which a softer grade of ceramic bond is wholly unsuited. The vitreous bonding compositions heretofore accepted as being most satisfactory for the making of fused alumina abrasive products have been found wanting in one or more of the aforementioned properties as a bond.

It is an object of the present invention to provide vitreous bonded, fused alumina articles embodying borosilicate vitrified bonding compositions which minimize or avoid many, if not all, the disadvantages or undesirable features of prior art bonds.

It is a further object to provide vitrified bonded, fused alumina articles having improved properties and cutting characteristics.

In accordance with the present invention I have discovered that vitrified bonded, fused alumina abrasive articles such as grinding wheels having improved properties and performance can be made by including lithia in vitrified alkaline oxide borosilicate bonding compositions as at least a part of the alkali metal oxide contained in the compositions. The fused alumina particles constitute the abrasive element of the articles and are therefore the predominant ingredient of the abrasive article, amounting to at least 50% by weight of the article and usually a much higher proportion of the article. The lithia appears to impart to the bonding composition an unexpectedly high affinity for the alumina particles so that the latter are thoroughly wet by the bond at low firing temperatures in the neighborhood of 1000° C. and even lower. Furthermore, the herein-described vitrified bonding compositions containing lithia retain this high affinity and/or bonding action toward granular fused alumina even when the bonding compositions contain high percentages of silica in the range of 60% or more, for example 69%. Consequently, I have found it possible to make vitreous-bonded alumina articles with a hard and exceedingly vitreous bond containing a minimum of crystalline matter even when the articles are fired at temperatures of 1000° C. and lower. I have further found that when the alumina particles are bonded by vitreous borosilicate compositions containing lithia in accordance with the present invention the fluidity of the vitreous bonding compositions at the firing temperature and their wetting of and/or adherence to the alumina abrasive particles permits the use of a lesser amount of the bond than has heretofore been considered necessary for the provision of the requisite high strength, or in the event that the maximum amount of strength is desired, provides an increase in strength without increasing the amount of bond. Moreover, the permissible presence of large amounts of silica imparts a hardness to the bond which has heretofore been lacking in vitreous bonds fired at temperatures comparable to the temperatures at which the present bonds are fired. The bonding compositions herein employed usually contain less than 10% of alkali oxides which alkali oxides include from about 1.5% to 5% of lithia. The bonding compositions also contain up up 15% boric oxide and over 60% of silica. Although the borosilicate bonding compositions made following the teachings of the present invention usually contain 60% or more of silica in order to promote and attain a bond of high hardness, it is permissible to use lower amounts of silica wherever bond hardness is not a prime factor and extremely low firing times and temperatures are a leading consideration and a softer bond is permissible, or even desirable. The lithia, in these softer bonding compositions will still effect its wetting action upon the alumina particles and lower the amount of bond required below that required were the lithia omitted. It has been found desirable to include a small percentage of alumina in the bonding compositions together with small amounts of alkaline earth or other fluxes.

In order that the invention may be more clearly understood, reference is made to the drawing in which Figure 1 is a diametrical cross-sectional view through an abrasive wheel made in accordance with the present invention, and in which a metallic reinforcing ring has been embedded;

Figure 2 is a perspective view of a mounted abrasive wheel made in accordance with the present invention;

Figure 3 is a view at high magnification depicting schematically the structure of a fragmentary portion of a bonded alumina abrasive body made in accordance with the present invention and showing the disposition of the vitreous bond and the presence of intergranular voids throughout the article;

Figure 5:
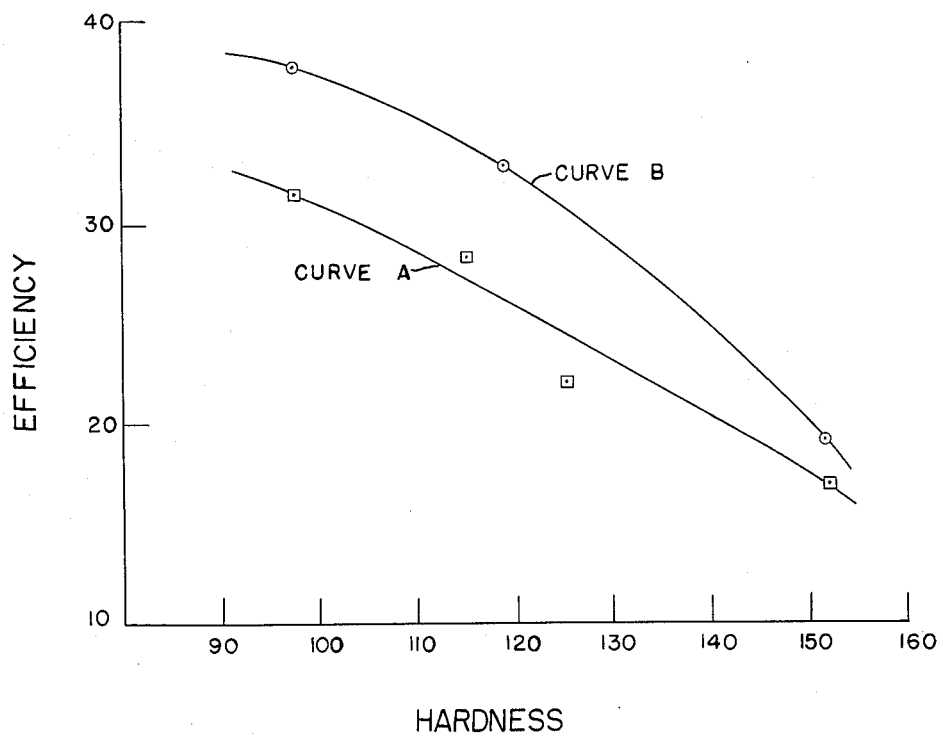

Figure 4 is a similar highly magnified view of an alumina abrasive body in which a typical prior art vitreous bond is used; and Figure 5 is a graph of efficiency vs. wheel hardness comparing the abrasive wheels made in accordance with the present invention and embodying a lithia-containing borosilicate bond with abrasive wheels in which the bond is a vitrified borosilicate composition containing no lithia.

The following examples, which are presented for illustrative purposes only and are not intended to limit the invention in any way, show more specifically the manner in which vitreous bonded, fused alumina abrasive articles are made in accordance with the present invention.

EXAMPLE I

*Raw batch composition*

| Raw materials: | Parts by weight |
|---|---|
| Flint | 750 |
| Feldspar | 10 |
| Alumina | 6 |
| Boric acid | 262 |
| Cryolite | 98 |
| Potassium nitrate | 45 |
| Fluorspar | 3 |
| Talc | 28 |
| Lithium carbonate | 90 |

A raw batch of the above composition is fused together to form a well-fused homogeneous fluid mass which is quenched by pouring it into water, and the water-quenched material dried and ground to a fineness of 200 mesh and finer.

Vitrified bonded, fused alumina internal grinding wheels 4" in diameter and 1" in thickness with ½" arbor holes are made as follows: A molding composition suitable for pressure molding is prepared from a mixture of the above-described pulverized vitreous frit, fused alumina abrasive particles and dextrine in the following proportions:

| | Parts by weight |
|---|---|
| 60 grit size fused alumina abrasive grain | 91 |
| Pulverized, lithia-containing borosilicate frit (as above) | 9 |
| Dextrine | 1½ |
| Water | 2½ |

The above molding composition is pressed at 1500 pounds per square inch to form a wheel of the desired size and shape and the molded article removed from the mold, dried, and fired at a temperature of 1000° C. over a total firing period of ten hours. A suitable firing schedule is one requiring four hours for bringing the articles up to a temperature of 1000° C., holding at that temperature for two hours, followed by four hours to bring the article down to room temperature or slightly above. The fired articles are removed from the kiln and dressed by conventional procedure.

The vitrified bond of the finished article by calculated oxide analysis is found to have the following percentage composition:

| | |
|---|---|
| $SiO_2$ | 69.10 |
| $Al_2O_3$ | 2.91 |
| CaO | .33 |
| MgO | .63 |
| $K_2O$ | 2.00 |
| NaO | 3.95 |
| $B_2O_3$ | 12.96 |
| $LiO_2$ | 3.35 |
| $F_2$ | 4.57 |
| $Fe_2O_3$ | .20 |

EXAMPLE II

Reinforced grinding wheels such as that shown in Figure 1 wherein the bonded abrasive wheel body 5 having an arbor hole 6 is reinforced by an annular steel ring 7 have been made from the composition set forth in Example I and following the same operational procedure given under Example I with the exception that in filling the mold an annular steel reinforcing ring 7 is embedded within the molded shape during the filling operation by placing the ring in the mold after the mold has been partially filled with the molding mixture and then placing the remainder of the molding mixture in the mold on top of the ring. If desired, that part of the molding mixture initially placed in the mold before the ring is placed in the mold can be subjected to low pressure before inserting the ring so that the ring will be assured of proper positioning. Obviously, one or more additional reinforcing rings can be similarly embedded in the wheel during the molding operation, or the reinforcing elements may be of another shape, such as steel rods, bars, screening or the like. The article is then finally pressed so that the ring or other element takes the desired position, such as that shown in the drawing. The low firing temperature required for full maturing and vitrification of the bond is advantageous in that it is not detrimental to the reinforcing ring or rings or other reinforcing elements which retain all their original strength and therefore accomplish their purpose of strengthening the abrasive body.

EXAMPLE III

The same bonding composition and abrasive molding mixture used in Examples I and II can also be used to make mounted abrasive wheels such as that illustrated in Figure 2 in which the bonded abrasive body 9 is molded about a stainless steel spindle or shaft 10 which has one end embedded within the abrasive body 9 during the molding operation. This is most readily accomplished by providing the bottom plunger of the mold with a central opening of the same diameter as the stainless steel shaft so that the end of the shaft extends upwardly into the mold barrel to the extent to which it is desired to embed the shaft within the body. The firing temperature required for maturing the bond is insufficient to damage the metal shaft. The above-described method of making mounted abrasive articles wherein the mounting spindle or shaft is embedded in the abrasive body at the time that it is molded and prior to the firing of the article is of obvious advantage over the practice heretofore required with vitreous bonds maturing at higher temperatures where it has been necessary to fire the abrasive body separately and then cement the desired shaft or spindle within a hole provided in the fired abrasive shape. The difficulties involved in the latter method of centrally locating the spindle with the accuracy necessary for true grinding is apparent. The elimination of such difficulties, as well as the greater ease of such one step molding of the complete mounted article, further adds to the advantages already derived from the use of the present bond.

Figure 3 of the drawing represents schematically the structure of vitrified bonded, fused alumina abrasive bodies bonded by the lithia-containing borosilicate bonding compositions of the present invention. As therein shown the fused alumina abrasive grains 11 are held together by a vitreous bond 12 which, during the firing of the article, has flowed along the surfaces of the abrasive particles to thoroughly wet them and bond them together by small fillets 13 of the bond located in the small angular spaces between or formed by the contacting points or edges of the abrasive particles. The disposition of the bond in the manner described leaves the larger intergranular pore spaces 14 of the article substantially open and unfilled with bond. As a result the abrasive body has a fast and cool, free cutting action.

By way of comparison, Figure 4 depicts a fused alumina abrasive body in highly magnified form in which the alumina particles 15 are bonded by the same amount of a vitrified borosilicate bond 16 which in composition is representative of common prior art practice and does not contain lithia. It is to be noted from the structure of the article shown in Figure 4 that the bond has not wet the surfaces of the abrasive particles effectively nor shown any pronounced affinity toward the abrasive particles. Consequently, instead of flowing along the surfaces of the abrasive particles and collecting in the angular spaces between the contacting corners and edges of the adjoining abrasive grains, it has to a large extent remained where it was lodged during molding, clogging up the intergranular pores or spaces of the abrasive body where it is of little effect in promoting the strength of the article. As a result, in spite of the fact that the same amount of bond is used as was used in making the bonded abrasive structure of Figure 3, the strength of the body is substantially less than that of the body shown in Figure 3. The illusion that Figure 3 gives that less bond is present is undoubtedly due to the greater effectiveness with which the bond has been distributed and uniformly coated over the entire surfaces of the abrasive particles in the structure in Figure 3. Furthermore, reverting to Figure 4, the bond contains a substantial amount of fine crystalline material 17 so that it is not in fully vitrified condition. As already stated, the intergranular pores 18 have been so filled with the bonding composition that freeness of cutting action and coolness of cut are lost to a great extent.

Vitrified bonded, fused alumina abrasive articles made in accordance with the teachings of the present invention wherein the bond consists of a borosilicate composition containing lithia and containing a high percentage of silica have been shown to have a longer wheel life, resulting in more pieces being ground per wheel, averaging 20% to 60%, and even as high as 100% above the wheel life shown by competitive abrasive wheels of comparative grading but embodying vitreous bonds of other composition. This greater wheel life is due to the added mechanical strength of the bonding composition which is believed to be obtained because of the greater affinity of the bond for the fused alumina surfaces, which in turn requires the use of a minimum amount of bond to secure the necessary strength of structure. The sharp abrasive grains as a result are held securely in a minimum amount of bond and permitted to break down slowly rather than being torn from the bond before they have served their useful life. The provision of a greater amount of actual pore space without sacrifice in strength of wheel structure has also provided a vitrified bonded, abrasive body which for the first time is free cutting and which requires a minimum amount of dressing down throughout its service life. The improved wheel structure secured through practice of the present invention has resulted in the maintenance of closer tolerances and the production of improved surface finishes on work surfaced with the abrasive wheels. It has also been possible to provide an abrasive wheel which has a structure so versatile that one wheel can be used to perform satisfactorily for a number of different grinding operations, thereby reducing the number of abrasive wheels which must be kept on hand for grinding purposes.

The graph of Figure 5 demonstrates the superior cutting ability of the wheels of the present invention as compared to that of a typical type of prior art vitreous bonded abrasive wheels. The efficiency, as plotted along the vertical axis, is the weight of metal removed per unit weight of wheel loss during grinding a given metal. The hardness of the wheel is plotted along the horizontal axis. It is measured by using a machine grader, which drops a weighted tool, having a fixed contact surface, a fixed number of times through a fixed distance onto the flat surface of the grinding wheel. The depth of penetration of the tool into the wheel is the measure of the wheel hardness. Thus when a hardness of 60 is reported on the graph this means that during the hardness test above described the weighted tool penetrated 60 thousandths of an inch into the wheel. Wheels in the range of hardness covered by this graph are used for such operations as surface grinding of hardened steels. Curve A of Figure 5 represents a series of tests run on a prior art type of alumina abrasive wheels bonded with a borosilicate bond containing over 60% silica, less than 15% boric oxide, and no lithia, the hardness of these wheels being varied by varying the amount of bond in each wheel of this series. Curve B of Figure 5 represents a similar series of tests run on abrasive wheels made in accordance with the present invention. These wheels were bonded with varying amounts of a bond prepared according to the teachings of the present invention and containing over 60% silica, less than 15% boric oxide, and about 3.5% lithia. As can be seen from Figure 5, at all hardnesses within this tested range the efficiency of the present invention wheels was greater than that of the prior art borosilicate glass bonded wheels. This graph, showing the results of actual grinding tests, clearly indicates the surprising grinding results which are obtained when using abrasive wheels containing over 50% granular alumina abrasive material bonded with a lithia-containing borosilicate glass bond made in accordance with the present invention. This greater efficiency of the wheels of the present invention means that more metal can be removed by these wheels before they are expended, giving a greater wheel life measured in number of units ground per wheel.

To show that abrasive wheels made in accordance with the present invention have surprisingly longer wheel lives than abrasive wheels formerly used by industry as the best available for the same operations, the following examples of tests made during actual commercial production grinding with the wheels of the present invention in comparison with prior art abrasive wheels are given.

EXAMPLE IV

To determine the wheel life of wheels made in accordance with the present invention in comparison with the wheels being used by industry as the best available for internal grinding, tests were made during actual production at an industrial plant grinding the inner diameter of inner and outer bearings rings on three Heald centerless internal sizematic grinders and two Heald centerless internal gagematic grinders. Prior to the time of the test, prior art vitrified bonded aluminum oxide abrasive wheels had been used as the best available for these jobs. During these tests the grinders were run by the operator, first using the old type of abrasive wheels so as to determine the wheel lives, in number of units that could be ground with each wheel, of these wheels for these operations. After the wheel lives of the formerly used abrasive wheels were determined, wheels made in accordance with the present invention were installed on these grinders and their wheel lives determined. The results of these tests are given in Table I below:

TABLE I

| Machine | Wheel Life of Wheel Formerly Used, pieces | Wheel Life of Present Invention Wheel, pieces | Increased Wheel Life of Present Invention Wheel, percent |
|---|---|---|---|
| Sizematic #4 | 340 | 475 | 40 |
| Sizematic #8 | 350 | 510 | 46 |
| Sizematic #10 | 480 | 642 | 34 |
| Gagematic #2 | 295 | 510 | 73 |
| Do | 280 | 510 | 82 |
| Gagematic #14 | 500 | 725 | 45 |
| Do | 412 | 725 | 76 |

In each case the present invention wheels outperformed by a substantial percentage the glass bonded alumina abrasive wheels formerly used for this operation. This increased wheel life seemed in part to be caused by more even and less breakdown of the present invention wheels, making it possible to dress these wheels less and still remain within the finish tolerances.

EXAMPLE V

To further compare the life of the wheels of the present invention with the lives of the wheels currently used by industry as the best available, another test similar to that described in Example IV was made. This test was made during production grinding of the inner diameter of inner bearing rings on a Bryant #2209–D grinder. Up until the time of this test 80 grit size alumina abrasive prior art wheels bonded with a borosilicate glass containing over 60% $SiO_2$, less than 15% $B_2O_3$, and no lithia were being used as the best wheels available for this operation. These prior art wheels had a wheel life for this operation of 200 pieces per wheel. In place of these formerly used wheels, 80 grit size alumina wheels made in accordance with the present invention were tested for this operation. It was found that these new wheels have a wheel life of 300 pieces, 100 pieces, or 50%, more than the wheel life of the borosilicate glass bonded alumina abrasive wheels formerly used as the best available for this operation, clearly indicating the surprising superiority of the wheels of the present invention.

EXAMPLE VI

To compare the life of the wheels of the present invention with the prior art wheels commonly used by industry for portable internal grinding, a test was run during production at a motor plant, comparing the lives of these two types of wheels when used with an M=B air grinder for portable grinding of forged steel crankshaft oil holes. Prior to the time of this test prior art alumina wheels were used for this operation. An average of 18 oil holes were being finished with each of these prior art wheels. Using lithia-containing borosilicate bonded wheels made according to the present invention and containing over 50% granular alumina abrasive material, an average of 40 oil holes were finished with each wheel, an increase of 22 holes per wheel over the formerly used wheels.

The results of these tests show a marked superiority in wheel life of the present invention wheels when compared with the abrasive wheels used by industry as the best available. While these tests were all made on internal grinding operations, it is believed that similar results are obtainable for other types of grinding. Therefore, it is to be understood that the present invention is not to be limited to internal grinding wheels, but is intended to cover abrasive wheels for other types of grinding.

Having described the invention it is desired to claim:

1. A bonded, fused alumina article comprising at least 50% fused alumina grains and a vitrified borosilicate bond containing by oxide analysis approximately 69% silica, 13% boric oxide, and under 10% alkali oxides, the alkali oxides including approximately 3% of lithium oxide.

2. A bonded, fused alumina article comprising fused alumina grains and a vitrified borosilicate bond containing by oxide analysis approximately 69% silica, 13% boric oxide, and under 10% alkali oxides, the alkali oxides including approximately 3% of lithium oxide.

3. A bonded, fused alumina article comprising fused alumina grains and a vitrified borosilicate bond containing by oxide analysis approximately 69% silica, 13% boric oxide, 3% alumina, and under 10% alkali oxides, the alkali oxides including approximately 3% of lithium oxide.

4. A vitrified bonded, fused alumina article comprising fused alumina grains and a vitrified, lithia-containing borosilicate bond containing at least 60% silica, up to 15% boric oxide and from 1.5 to 5% lithia.

5. A vitrified bonded, fused alumina abrasive article comprising an abrasive body mounted upon a metal shaft, said abrasive body comprising fused alumina abrasive grains and a vitrified, lithia-containing borosilicate bond containing at least 60% silica, up to 15% boric oxide and 1.5 to 5% lithia.

6. An abrasive article in accordance with claim 4 in which the abrasive body contains a metal reinforcing element embedded within the body of said article.

7. A vitrified bonded, fused alumina article comprising at least 50% fused alumina grains and a vitrified, lithia-containing borosilicate bond consisting essentially of at least 60% silica, up to 15% boric oxide, from 1.5–5% lithia, and up to about 5% combined fluorine.

References Cited in the file of this patent

UNITED STATES PATENTS

| 2,316,161 | Harvey | Apr. 13, 1943 |
| 2,332,241 | Milligan et al. | Oct. 19, 1943 |
| 2,334,266 | Houchins | Nov. 16, 1943 |
| 2,343,218 | Lombard | Feb. 29, 1944 |
| 2,478,626 | Gregorieff | Aug. 9, 1949 |